United States Patent
Ayyadurai

(10) Patent No.: US 6,718,367 B1
(45) Date of Patent: Apr. 6, 2004

(54) FILTER FOR MODELING SYSTEM AND METHOD FOR HANDLING AND ROUTING OF TEXT-BASED ASYNCHRONOUS COMMUNICATIONS

(75) Inventor: V. A. Shiva Ayyadurai, Belmont, MA (US)

(73) Assignee: General Interactive, Inc., Cambridge, MA (US)

( * ) Notice: Subject to any disclaimer, the term of this patent is extended or adjusted under 35 U.S.C. 154(b) by 0 days.

(21) Appl. No.: 09/323,312

(22) Filed: Jun. 1, 1999

(51) Int. Cl.[7] ............................................. G06F 15/16
(52) U.S. Cl. ...................... 709/206; 709/204; 709/207; 715/500.1; 715/531; 345/733; 370/260; 379/93.01; 706/12; 706/45; 706/47; 704/1; 707/1; 707/6
(58) Field of Search ................................ 709/206, 207, 709/204; 379/93.01; 345/733; 370/260; 707/1, 6; 715/500.1, 531; 706/12, 45, 47; 704/1

(56) References Cited

U.S. PATENT DOCUMENTS

| | | | | |
|---|---|---|---|---|
| 5,278,955 A | * | 1/1994 | Forte et al. | 703/26 |
| 5,598,557 A | * | 1/1997 | Doner et al. | 345/835 |
| 5,619,648 A | * | 4/1997 | Canale et al. | 709/206 |
| 5,835,087 A | * | 11/1998 | Herz et al. | 345/810 |
| 5,867,799 A | * | 2/1999 | Lang et al. | 707/1 |
| 6,002,998 A | * | 12/1999 | Martino et al. | 704/1 |
| 6,035,326 A | * | 3/2000 | Miles et al. | 709/206 |
| 6,065,055 A | * | 5/2000 | Hughes et al. | 709/229 |
| 6,072,942 A | * | 6/2000 | Stockwell et al. | 709/206 |
| 6,085,201 A | * | 7/2000 | Tso | 707/505 |
| 6,122,632 A | * | 9/2000 | Botts et al. | 705/1 |
| 6,148,289 A | * | 11/2000 | Virdy | 705/1 |
| 6,161,130 A | * | 12/2000 | Horvitz et al. | 709/206 |
| 6,163,782 A | * | 12/2000 | Singhal | 707/10 |
| 6,182,059 B1 | * | 1/2001 | Angotti et al. | 706/45 |
| 6,182,118 B1 | * | 1/2001 | Finney et al. | 709/206 |
| 6,278,996 B1 | * | 8/2001 | Richardson et al. | 707/6 |
| 6,295,543 B1 | * | 9/2001 | Block et al. | 707/5 |
| 6,301,608 B1 | * | 10/2001 | Rochkind | 379/93.24 |
| 6,356,633 B1 | * | 3/2002 | Armstrong | 379/265.11 |
| 6,356,936 B1 | * | 3/2002 | Donoho et al. | 709/206 |
| 6,411,947 B1 | * | 6/2002 | Rice et al. | 706/47 |
| 6,477,551 B1 | * | 11/2002 | Johnson et al. | 715/531 |
| 6,515,681 B1 | * | 2/2003 | Knight | 345/751 |

* cited by examiner

Primary Examiner—Kenneth R. Coulter
Assistant Examiner—Hai V. Nguyen
(74) Attorney, Agent, or Firm—Burns, Doane, Swecker & Mathis, LLP

(57) ABSTRACT

A three phase process and system is disclosed for automatically and adaptively filtering and classifying electronic text-based messages, such as e-mail, e-commerce transactions, CGI forms, and optically scanned and textualized written and facsimile messages. In the first phase of processing, the message is subjected to one or more feature extraction methodologies. The output signals from the first phase are then clustered in the second phase of processing using one or more clustering methodologies. The second phase yields a suggested five characteristics of the message: attitude, issue or problem, request, customer type, and author education level. In the third phase, a human operator interface presents the original message along with the proposed properties and allows an operator to correct or tune the properties, and corrections and tuning being fed back into the network of a feature extraction and clustering methodologies. Finally, the architecture of the system is such that feature extraction and clustering methodologies may be added, updated, or removed in a module fashion to allow the system to be customized to various applications and to allow the system to be modernized as new algorithms become available.

49 Claims, 2 Drawing Sheets

FILTER FOR MODELING SYSTEM AND METHOD FOR HANDLING AND ROUTING OF TEXT-BASED ASYNCHRONOUS COMMUNICATIONS

TECHNICAL FIELD OF THE INVENTION

This invention pertains to the arts of automatic analysis, classification, characterization and routing of text-based messages in electronic messaging systems. The text message filtering and modeling system and method disclosed is especially suitable for use in analyzing, classifying, routing, and directing large volumes of electronic messages with a wide variety of content, authorship, and intent directed generally at a single, large recipient such as a corporation.

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

Electronic mail and facsimile ("fax") messaging have become critical tools of everyday personal and business life. Most corporations, government agencies, organizations, and institutions have established fax numbers and e-mail addresses for a wide variety of contact purposes, including requesting information such as literature and office locations from the entity, requesting investment information, requesting service on or technical support for a product, reporting a product problem or failure, submitting suggestions for products and service improvements, submitting complimentary comments, and in some cases, carrying on dialogues with personalities and celebrities associated with the entity. Fax and e-mail messaging have converged in electronic form, as messages originating in the form of fax are commonly captured by computers with fax/modem interfaces and optically converted to text files, and as many services offer low cost fax message delivery via e-mail-based interfaces.

Underlying the tremendous proliferation of fax and e-mail are several factors, including wide-spread availability of inexpensive e-mail clients such as personal computers, and inexpensive fax machines, and the development of common standards for exchange of electronic text messages between computers, including RFC821 Simple Mail Transfer Protocol ("SMTP") from the Internet Network Information Center, and Recommendation X.400 from the International Telecommunications Union ("ITU").

Consequently, corporations, government agencies, and other entities which successfully promote the availability of their fax telephone numbers and e-mail addresses can receive thousands to tens-of-thousands of messages per day. Traditionally, all of the messages are received in a general repository, or "mailbox", and reviewed by human agents for their content, intent, and determination of the correct disposition of the e-mail is made. This may involve sending the author a standard reply, and/or copying or fowarding the e-mail to one or more divisions, departments, or individuals within the organization for further handling. In the later case where multiple parties must be consulted, the consolidation of replies from all of the parties can be cumbersome and overwhelming, given the volume of messages to be handled. For example, assuming a company receives five thousand messages per day, and if each one of those messages contains issues or requests that involve an average of 3 departments or individuals to respond, the original message must be read once by the reviewing agent and the receiving departments may read the forwarded message one to three times per department before it reaches the person who can respond. Under such circumstances, 5,000 received e-mails may result in up to 20,000 to 50,000 reviews of those messages in the company. In many cases, the final recipient may need to instigate a short dialogue including several message exchanges with the author in order to ascertain exactly what the author needs or how the author can be serviced. So, a daily volume of 5,000 new messages quickly accumulates to a total network volume and work load of tens-of-thousands to even a hundred-thousand messages per day.

Analogous situations exist in the telephone call center and paper mail paradigms. For example, a single toll-free telephone number may be used for customer orders, information requests, service reports, etc. In this paradigm, systems for handling large call volumes, known as Automated Call Distributors, have been developed to sort and route telephone calls to human agents. Systems known as "Interactive Voice Response" have been developed to allow many of the calls to be handled entirely automatically by providing bank-by-phone, tele-reservations, and other well-known telephone-based services. In the paper mail paradigm, automated sorting and routing systems have been developed using barcode markings and optical recognition of handwriting.

The following publications and standards provide additional information into the background of the arts of e-mail routing, natural language processing, and pattern recognition:

1. Internet Network Information Center ("InterNIC") Request for Comment 821, "Simple Mail Transfer Protocol" (SMTP), Filename RFC821.TXT from http://www.internic.net.
2. International Telecommunciations Union ("ITU") Recommendation X.400, available from the ITU, Berne, Switzerland, and from the ITU's website at www.itu.org.
3. "Fuzzy and Neural Approaches in Engineering" by Lofteri H. Tsoukalas and Robert E. Uhrig, published by John Wiley and Sons, Inc., copyright 1997, ISBN number 0-47116-003-2.
4. "Pattern Recognition and Image Analysis" by Earl Gose, Richard Johnsonbaugh, and Steve Jost, published by Prentice Hall, copyright 1996, ISBN number 0-13-23645-8.
5. "Natural Language and Exploration of an Information Space: The ALFresco Interactive System", a white paper by Olivero Stock, appearing starting on page 421 of the book "Readings in Intelligent User Interfaces", edited by Mark T. Maybury and Wolfgang Wahlster, published by Morgan Kaufman Publishers, Inc., copyright 1998, ISBN number 1-55860-444-8.
6. U.S. Pat. No. 5,768,505 to Gilchrist, et al.
7. U.S. Pat. No. 5,859,636 to Pandit.

In the electronic messaging arts, United States patents have been issued for systems which route messages based on well-defined codes stored within the message, including the recipient's network address and a copy list of network addresses. There exist methodologies that are well-known which individually yield useful information and characterizations of written messages, including use of neural network, fuzzy logic, and statistical analysis techniques. However, there is an absence in the art of automatic systems which perform intelligent routing of messages which are addressed to a multipurpose network address, which employ these analysis and characterization techniques coupled with message routing technology.

Therefore, there exists a need in the art for an automated system and method to review large volumes of text messages for their content, intent, need, and purpose in order to expedite the time-to-response to the messages.

Further, there exists a need in the art for this automated system to use conventional technology and techniques which find practical application to the analysis of natural language written speech.

Additionally, there exists a need in the art for this system to provide for initial training of the rules and thresholds used in the analysis of the messages, and for the training, or "leaning", of the algorithms to continue over time based on user input and changes to initial analysis conclusions, such that the utility of the system grows as it learns how to filter messages.

Still further, there exists a need for this system to be implemented using an architecture which allows the addition, removal, and upgrade of the methodologies in order to tune the system to particular applications of the system and to update the system's performance as new technologies become available.

BRIEF DESCRIPTION OF THE DRAWINGS

For a more complete understanding of the invention, the following disclosure can be taken in conjunction with the presented figures.

SUMMARY OF THE INVENTION

An object of the invention disclosed herein is to provide an automated system for reviewing, characterizing, and classifying asynchronous text messages. A further object of this invention is to employ multiple analysis methodologies and techniques which are well known within the art to provide an economical and practical solution. Still another object of the invention is to allow a user to review the initial characterization and classification of individual messages through a user interface, to correct or modify the characterization and classification, and to input those changes to a learning network of analysis methodologies. A final object of the invention is to provide an architecture which is modular in construction, allowing new analysis techniques to be installed, and existing techniques to be removed or updated. The invention as disclosed finds practical use in large-volume e-mail and text-based message handling and routing systems.

The system and method disclosed herein provides for the automated and adaptive analysis and classification of text-based messages which may original as facsimile, email, Internet e-commerce, or website CGI forms. Generally, corporate websites have a "single point of contact" e-mail address or fax number for contacting the company, regardless of the intent, content, or nature of the message. A single e-mail address may receive customer service requests, new product literature, customer complaints, change of service request, investor information, sales quotes, etc. The message filtering and modeling system presented provides for the characterization of each message based on the author's attitude, issue or problem addressed, information or action requested, and the type and profile of the author including his or her educational level and personal interests.

The system and method yields tagged e-mails, in which the tags contain the relative scores or rankings of these properties, and further ranks each message within a general property category to sub-properties. The tagged e-mails can then be routed for review by one or more appropriate corporate divisions, departments, or individuals, or a reply could be automatically generated.

DETAILED DESCRIPTION OF THE INVENTION

The following disclosure, when taken in conjunction with the presented figures, sets forth the invention which meets the objects of the invention set forth in the.

SUMMARY OF THE INVENTION

Figure 1:
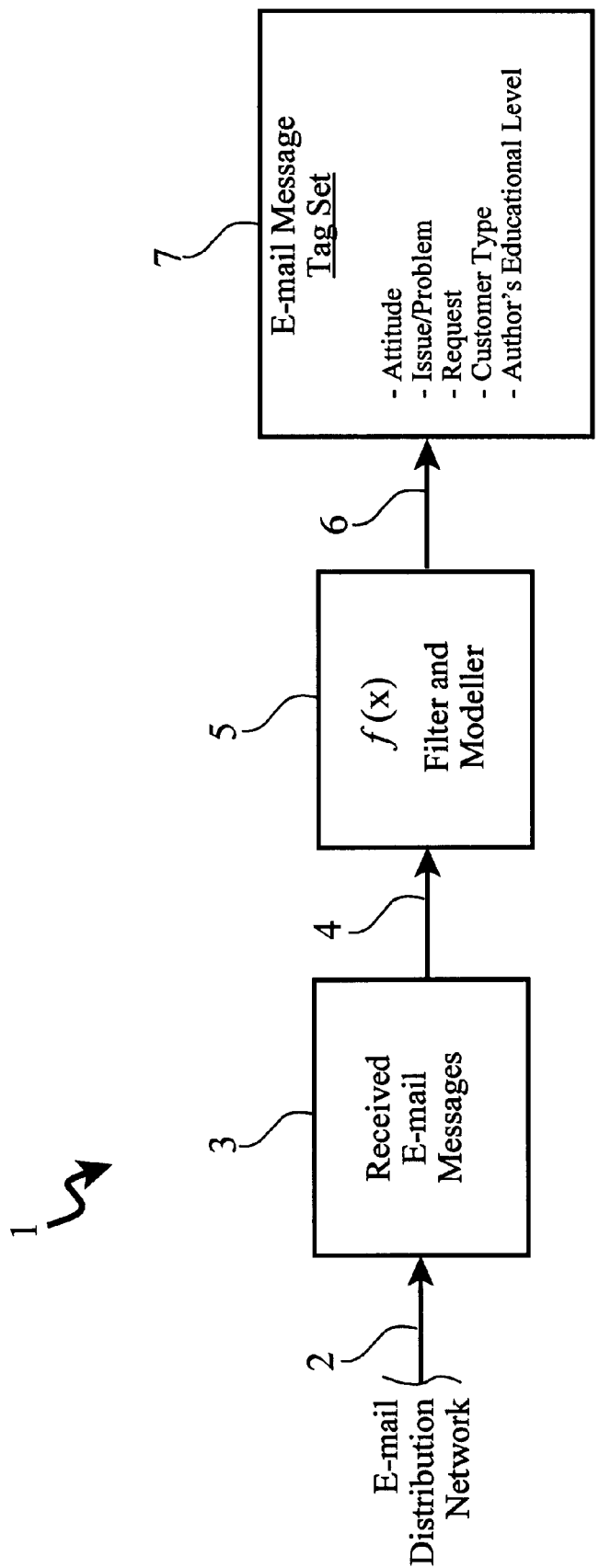
FIG. 1 shows a high-level system view of the invention.

Turning to FIG. 1, the text message filtering and modeling system receives text messages (3), preferably in the form of Simple Mail Transfer Protocol ("SMTP") e-mail messages. The SMTP standard, RFC821, defines a method to transfer electronic messages between networked computers. An SMTP e-mail message is a text message comprised of a header and a body. The header includes deterministic factors regarding the author's name, the author's return e-mail address, the intended recipient's e-mail address, such as the time of the e-mail transmission, his or her return e-mail address, a priority flag, a confidentiality flag, a copied recipients list, and a subject field. E-mails commonly contain a signature block of text, which may include the recipient's company, title, telephone and fax number. The signature block typically follows the header and the body in the message.

Another standard for transferring messages has been developed by the International Telecommunications Union ("ITU"), X.400, and is also well-known in the art. The use of SMTP is the preferred embodiment of the system, whereas SMTP is much more commonly used and less complex than the X.400 protocol. However, X.400 would provide a functional equivalent for an alternate embodiment. In fact, the invention disclosed herein is useful for filtering any text message in electronic form, such as letters, fax messages, and survey response cards which have been scanned and subjected to optical character recognition.

The body of the message, which contains the free-form, natural language message from the author, is analyzed by a filter and modeler (5). The filter and modeler (5) comprises a standard e-mail server hardware platform well-known within the art, including a computer, such as an IBM-compatible personal computer, and operating system, such as Microsoft Windows NT. The input means (4) is a 100 BaseT Ethernet interface, preferably. The filter and modeler (5) further comprises persistent data storage, such as a hard disk drive, a communications protocol stack, such as TCP/IP with secure sockets, and an application program which performs the method described infra and illustrated in FIG. 2.

The actual physical message input means can be any of many well-known methods, including an Ethernet or other Local Area Network interface ("LAN NIC"), using any appropriate data communications protocol such as Transfer Control Protocol/Internet Protocol ("TCP/IP"). Alternatively, a shared database, preferably with an open interface such as ODBC, or simple computer disk files can also be employed as the input means.

The tagged and characterized e-mail messages (7) are then output by the filter and modeler via a number of common data transfer means (6), including all of the means listed for receiving the message input described previously.

Figure 2:
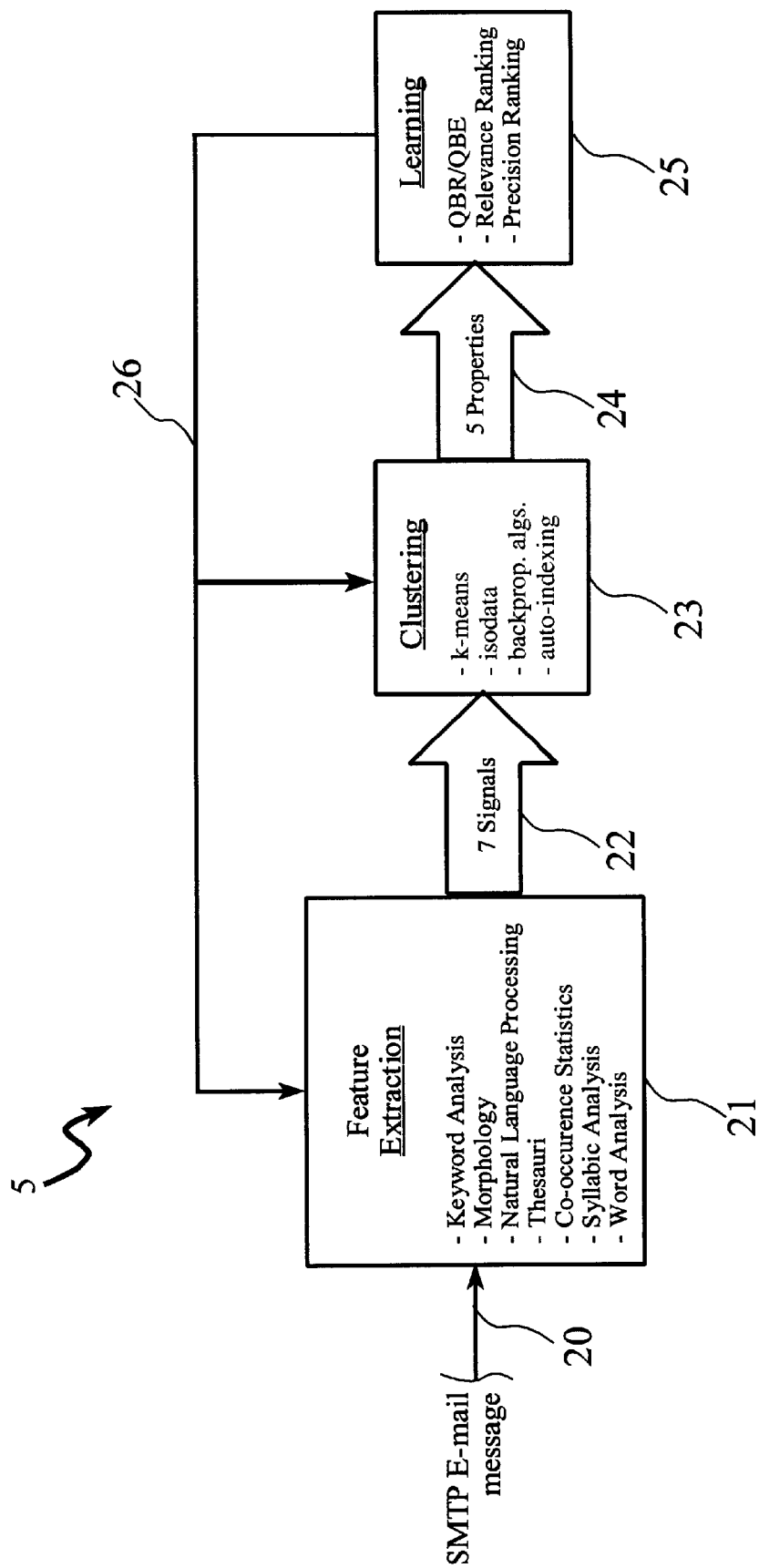
FIG. 2 shows a detailed view of the method employed by the system.

Turning to FIG. 2, details of the filter and modeler (5) process are set forth. The inventive combination of processes includes the steps of first performing feature extraction (21) using one or more known feature extraction methodologies, outputting one or more signals (22) to a clustering process (23) which employs one or more known clustering techniques, and then allowing for an optional human review of the assigned properties (24) to be input and "learned" by the network such that the knowledge base is improved.

As shown in FIG. 2, a received SMTP e-mail message (20) is first subjected to one or more feature extraction methods (21). The feature extraction methods can be any one or multiple methods of pattern recognition well known within the art, and in the preferred embodiment, minimally includes keyword analysis, morphology, natural language processing, thesauri, co-occurrence statistics, syllabic analysis and word analysis. The keyword analysis provides a measure of how often particular words are used in sentences, paragraphs and pages. The thesauri can be used to dimensionally reduce the output of the various characterization methods. Co-occurrence statistics indicate how often certain words appear near each other in the text. Syllabic analysis and word analysis yield an estimate of the education level of the author and his or her profile, such as his or her interests, hobbies, and socioeconomic status. The feature extractor outputs seven signals:

(a) keyword frequencies;

(b) co-occurrence statistics;

(c) a dimensionally-reduced representation of the keyword frequencies;

(d) phoneme frequencies;

(e) structural pattern statistics for sentences, paragraphs, and pages;

(f) estimated education level of the author based on word choices and complexity of sentence structure; and (g) the customer type.

The structure of the feature extractor is preferably implemented using modular and object-oriented software design techniques, which allows the addition of new analysis methods, removal of others, and updating of existing methods in a modular fashion. As new methods and algorithms become available, they can be incorporated or substituted into the feature extractor. The algorithms themselves are well-known within the art.

The seven output signals (22) from the feature extractor (21) are received by a clustering process (23), which includes one or more commonly known clustering algorithms such as k-means algorithms, isodata techniques, simple learning algorithms such as small backpropagation algorithms, and auto-indexing methods. The first of the five properties assigned to the e-mail message is "attitude". The tone of the e-mail message is ascertained by the choice of words and frequency of those words used in the message. An attitude property may be positive, neutral, or negative. The second of the five properties assigned to the message is "issue or problem". One or more central themes are detected in the message, such as a problem being reported with a product. The third property assigned to the message is "request", such as a request for information, e.g. an annual report, or request for consideration for employment. The fourth property assigned to the message is "customer type", which indicates demographic information about the author of the message, such as the author is an avid collector of the product or an environmental activist. The fifth property assigned to the e-mail is the author's apparent educational level, based on syllabic and word analysis.

The five properties (24) generated by the clustering process (23) are then received by a learning process (25), which performs query by relevance ranking and query by example ("QBE"), both of which are well known in the art. A user interface ("UI") allows a human operator to optionally review an e-mail and its assigned properties, change some or all of the properties, and submit it to the learning process (25) which then updates (26) the rules and thresholds used in the feature extractor and the clustering process. This human review and correction may be necessary as language used in a message changes meaning over time, such as the case with slang expressions. For example, when the feature extractor is originally configured, calling a product a "real bomb" may mean that it is a failure or a bad product, and therefore may generate a negative attitude property. However, in time, slang language may begin to use the term "bomb" as a good term, and the human operator review will update this as it occurs.

As the process is updated and the learning continues, the automated classification and assignment of properties of the messages improves. The output properties of the messages can then be used in consideration with other deterministic factors of the message, such as the subject field, to enable auto-responses, one-to-many routing by company division, department, and individual. Further, useful management statistics may be derived from the accumulated properties over time.

It will be understood by those in the art that many changes and modifications to the invention as set forth herein can be taken without departing from the spirit and scope of the invention, such as the use of a non-IBM computer, an alternative operating system, or the receipt of non-SMTP and non-email text messages. The techniques, process, and system disclosed are equally useful on a wide variety of computers, operating systems, and text-based message formats, such as using the system to categorize written comment cards which have been scanned and converted to text using optical character recognition techniques, or analyzing paper letters which have been likewise scanned and converted to text. Further, the platform on which the inventive process is executed can alternatively be any suitable computer system running an operating system, such as a Sun Microsystems workstation running Solaris or a Digital Equipment Corporation Alpha system running UNIX.

What is claimed is:

1. A system for filtering and modeling electronic text messages comprising:

a message reception means for receiving an electronic text message into the system, said text message having a header and a body, said body containing a natural language text message from an author;

a feature extraction means for performing natural language analysis of the text message from the message reception means, said feature extraction means producing one or more output signals relating to any of keyword frequencies, word co-occurrence statistics, a dimensionally-reduced representation of the keyword frequencies, phoneme frequencies, structural pattern statistics for any of sentences, paragraphs and pages, estimated education level of the author, and customer type;

a clustering means receiving said output signals from said feature extraction means, said clustering means producing a set of assigned properties based upon the content of the body of the electronic message, said assigned properties including at least one of attitude, one or more issues presented, one or more requests, an author type, and an author's education level; and a learning process which receives said assigned properties and performs relevance ranking and query by example, and which is capable of learning changes to said assigned properties submitted via a user interface such that rules and thresholds used in said feature extraction means and/or clustering means are updated automatically in real time without operator intervention.

2. The system for filtering and modeling electronic text messages of claim 1 wherein said message reception means includes an electronic mail reception means.

3. The system for filtering and modeling electronic text messages of claim 2 wherein said electronic mail reception means includes a means for receiving electronic mail using the Internet Network Information Center RFC821 Simple Mail Transfer Protocol.

4. The system for filtering and modeling electronic text messages of claim 2 wherein said electronic mail reception means includes a means for receiving electronic mail using the protocol of the International Telecommunications Union Recommendation X.400.

5. The system for filtering and modeling electronic text messages of claim 1, further comprising an electronic mail transmission means.

6. The system for filtering and modeling electronic text messages of claim 5 wherein said electronic mail transmission means includes a means for transmitting electronic mail using the Simple Mail Transfer Protocol.

7. The system for filtering and modeling electronic text messages of claim 5 wherein said electronic mail transmission means includes a means for transmitting electronic mail using the protocol of the International Telecommunications Union Recommendation X.400.

8. The system for filtering and modeling electronic text messages of claim 1 wherein said message reception means further comprises an interface means to an asynchronous data network.

9. The system for filtering and modeling electronic text messages of claim 8 wherein said asynchronous data network further comprises an Ethernet local area network.

10. The system for filtering and modeling electronic text messages of claim 8 wherein said asynchronous data network further comprises a protocol handler with Transfer Control Protocol/Internet Protocol Internet capabilities.

11. The system for filtering and modeling electronic text messages of claim 1, further comprising an interface to an asynchronous data network.

12. The system for filtering and modeling electronic text messages of claim 11 wherein said asynchronous data network further comprises Ethernet local area network.

13. The system for filtering and modeling electronic text messages of claim 11 wherein said asynchronous data network further comprises a protocol handler with Transfer Control Protocol/Internet Protocol Internet capabilities.

14. The system for filtering and modeling electronic text messages of claim 1 wherein said message reception means further comprises a database interface means.

15. The system for filtering and modeling electronic text messages of claim 14 wherein said database means is a database with an open database interface.

16. The system for filtering and modeling electronic text messages of claim 1, further comprising an interface to a database means.

17. The system for filtering and modeling electronic text messages of claim 16 wherein said database means comprises an open database interface.

18. The system for filtering and modeling electronic text messages of claim 1 wherein said feature extraction means further comprises a keyword frequency analysis means which outputs a multi-dimensional keyword frequency signal.

19. The system for filtering and modeling electronic text messages of claim 1 wherein said feature extraction means further comprises a morphological process means for increasing the probability of pattern recognition.

20. The system for filtering and modeling electronic text messages of claim 1 wherein said feature extraction means further comprises a natural language processing means.

21. The system for filtering and modeling electronic text messages of claim 1 wherein said feature extraction means further comprises a dimensional reduction means which employs thesauri.

22. The system for filtering and modeling electronic text messages of claim 1 wherein said feature extraction means further comprises a word co-occurrence analysis means, which outputs a word co-occurrence statistics signal.

23. The system for filtering and modeling electronic text messages of claim 1 wherein said feature extraction means further comprises a syllabic analysis means which outputs a phoneme frequency signal.

24. The system for filtering and modeling electronic text messages of claim 1 wherein said feature extraction means further comprises word-level sentence, paragraph and page structure analysis means which outputs a structural pattern signal.

25. The system for filtering and modeling electronic text messages of claim 1 wherein said feature extraction means further comprises an author profile estimation means, out pulling an author profile signal.

26. The system for filtering and modeling electronic text messages of claim 1 wherein said feature extraction means further comprises an author education level estimation means, outputting an author education level signal.

27. The system for filtering and modeling electronic text messages of claim 1 wherein said clustering means further comprises a k-means means for producing message tags in the message tag set.

28. The system for filtering and modeling electronic text messages of claim 1 wherein said clustering means further comprises a isodata means for producing message tags in the message tag set.

29. The system for filtering and modeling electronic text messages of claim 1 wherein said clustering means further comprises a backpropagation learning analysis means for producing message tags in the message tag set.

30. The system for filtering and modeling electronic text messages of claim 1 wherein said message tag set further comprises an author's attitude tag.

31. The system for filtering and modeling electronic text messages of claim 1 wherein said message tag set further comprises an issue-problem tag.

32. The system for filtering and modeling electronic text messages of claim 1 wherein said message tag set further comprises a request tag.

33. The system for filtering and modeling electronic text messages of claim 1 wherein said message tag set further comprises an author's profile tag.

34. The system for filtering and modeling electronic text messages of claim 1 wherein said message tag set further comprises an author's education level tag.

35. The system for filtering and modeling electronic text messages of claim 1 further comprises a learning means which includes:

a tagged message reception means for receiving said tagged messages from said clustering means;

a network update means which is capable of modifying parameters, thresholds, and coefficients within said feature extraction means and within said clustering means; and a user interface means for presenting the received electronic text message and said message tag set, receiving operator input modifying said message tag set, and providing network updates to the system via said network update means.

36. A process for filtering and modeling electronic text messages of asynchronous communications systems comprising the steps of:

receiving an electronic text-based message via a reception media, said text message having a header and a body, said body containing a natural language text message from an author;

performing feature extraction by performing natural language analysis of the text message to produce one or more output signals relating to any of keyword frequencies, word co-occurrence statistics, a dimensionally-reduced representation of the keyword frequencies, phoneme frequencies, structural pattern statistics for any of sentences, paragraphs, and pages, estimated education level of the author, and customer type;

performing clustering according to said feature extraction output signals to produce a set of assigned properties based upon the content of the body of the electronic message, said assigned properties including an attitude, one or more issues presented, on or more requests, an author type, and an author's education level; and performing a learning process by receiving said assigned properties, executing relevance ranking and query by example, and learning changes to said assigned properties submitted via a user interface such that rules and thresholds used in said feature extraction means and/or clustering means are updated automatically in real time without operator intervention.

37. A process for filtering and modeling electronic text messages of asynchronous communications systems of claim 36 wherein said step of feature extraction further comprises performing keyword analysis on said text message.

38. A process for filtering and modeling electronic text messages of asynchronous communications systems of claim 36 wherein said step of feature extraction further comprises performing morphology on said text message.

39. A process for filtering and modeling electronic text messages of asynchronous communications systems of claim 36 wherein said step of feature extraction further comprises performing natural language processing on said text message.

40. A process for filtering and modeling electronic text messages of asynchronous communications systems of claim 36 wherein said step of feature extraction further comprises performing dimensional reduction of said signals using thesauri.

41. A process for filtering and modeling electronic text messages of asynchronous communications systems of claim 36 wherein said step of feature extraction further comprises performing co-occurrence statistical analysis.

42. A process for filtering and modeling electronic text messages of asynchronous communications systems of claim 36 wherein said step of feature extraction further comprises performing syllabic analysis.

43. A process for filtering and modeling electronic text messages of a sychronous communications systems of claim 36 wherein said step of feature extraction further comprises performing word analysis.

44. A process for filtering and modeling electronic text messages of asynchronous communications systems of claim 36 wherein said step of clustering further comprises performing k-means techniques.

45. A process for filtering and modeling electronic text messages of asynchronous communications systems of claim 36 wherein said step of clustering further comprises performing isodata techniques.

46. A process for filtering and modeling electronic text messages of asynchronous communications systems of claim 36 wherein said step of clustering further comprises performing auto-indexing techniques.

47. A process for filtering and modeling electronic text messages of a sychronous communications systems of claim 36 wherein said step of clustering further comprises performing backpropagation learning algorithm techniques.

48. A process for filtering and modeling electronic text messages of asynchronous communications systems of claim 36 further comprising the steps:

presentation of the electronic text message and the message tags to a user via a user interface;

receiving corrections to said message tags via said user interface from said user; and automatically modifying logic within said determination of inherent factor within said text message.

49. A computer-readable medium containing a data structure for storing property tags for electronic text-based messages comprising.

an identifier link to a received electronic text-based message, an entry for an author's apparent attitude;

an entry for an issue raised by the message, an entry for a request made in the message;

an entry for a demographic profile indication for the author; and an entry for an estimated education level of the author.

* * * * *

UNITED STATES PATENT AND TRADEMARK OFFICE
CERTIFICATE OF CORRECTION

PATENT NO. : 6,718,367 B1 Page 1 of 1
DATED : April 6, 2004
INVENTOR(S) : V.A. Shiva Ayyadurai It is certified that error appears in the above-identified patent and that said Letters Patent is hereby corrected as shown below:

Title page, Item [54] and Column 1, lines 1-4,
Title, replace "FILTER FOR MODELING SYSTEM AND METHOD FOR HANDLING AND ROUTING OF TEXT-BASED ASYNCHRONOUS COMMUNICATIONS" with -- FILTERING AND MODELING SYSTEM AND METHOD FOR HANDLING AND ROUTING TEXT-BASED ASYNCHRONOUS COMMUNICATIONS --.

Column 9,
Line 44, replace "on" with -- one --.

Signed and Sealed this

Twenty-sixth Day of October, 2004

JON W. DUDAS
*Director of the United States Patent and Trademark Office*